United States Patent [19]

Koiwai

[11] Patent Number: 5,255,986
[45] Date of Patent: Oct. 26, 1993

[54] PICTURE IMAGE FORMING APPARATUS WITH MECHANISM CONTROLLER

[75] Inventor: Masahiro Koiwai, Suwa, Japan

[73] Assignee: Seiko Epson Corporation, Tokyo, Japan

[21] Appl. No.: 768,322

[22] PCT Filed: Feb. 22, 1991

[86] PCT No.: PCT/JP91/00230
§ 371 Date: Dec. 16, 1991
§ 102(e) Date: Dec. 16, 1991

[87] PCT Pub. No.: WO91/12968
PCT Pub. Date: Sep. 5, 1991

[30] Foreign Application Priority Data

Feb. 22, 1990 [JP] Japan .................................... 2-41952

[51] Int. Cl.$^5$ .......................................... G06F 3/00
[52] U.S. Cl. ............................... 400/61; 395/114
[58] Field of Search ............... 400/61, 70, 71, 77; 395/113, 114

[56] References Cited

U.S. PATENT DOCUMENTS 4,891,769 1/1990 Tasaki ........................ 400/76

FOREIGN PATENT DOCUMENTS

| 0345018 | 12/1989 | European Pat. Off. | 400/61 |
| 60-66566 | 4/1985 | Japan | 400/61 |
| 62-82766 | 4/1987 | Japan | 400/61 |
| 62-103174 | 5/1987 | Japan | 400/74 |
| 63-207677 | 8/1988 | Japan | 400/61 |
| 63-288771 | 11/1988 | Japan | 400/74 |
| 64-42244 | 2/1989 | Japan | 400/61 |
| 1-142924 | 5/1989 | Japan | 400/61 |
| 2-17527 | 1/1990 | Japan | 400/61 |

Primary Examiner—Edgar S. Burr
Assistant Examiner—Steven S. Kelley
Attorney, Agent, or Firm—Ladas & Parry

[57] ABSTRACT

Picture image forming apparatus is made up of a main controller 70 which forms picture image data based on the data sent from an external host computer and a mechanism controller 80 for controlling mechanical members adapted to execute a printing sequence. The mechanism controller 80 issues information presenting timing of a printing sequence, for example, paper feed start time, printing ready time, and a paper discharge completion time, and informs the information to the main controller 70. The main controller 70 can supervise the printing sequence based on the received information without provided with a timer that supervises the printing sequence.

5 Claims, 4 Drawing Sheets

PICTURE IMAGE FORMING APPARATUS WITH MECHANISM CONTROLLER

TECHNICAL FIELD

This invention relates to a picture image forming apparatus, for instance, a laser printer, including a paper supply tray or a multifeeder device for supplying paper sheets, and a paper discharge tray or a mail box device which discharges paper sheets on which picture images have been formed.

BACKGROUND TECHNIQUE

A conventional laser printer comprises a main controller forming a picture image data based on a data from an external host computer, and a mechanical element controller a controlling mechanical elements (hereinafter mechanisms). In this laser printer a sheet of paper is supplied into the printer from a paper supply tray through a paper supply port of the printer. At this time, jamming of paper sheets during paper supplying operation is supervised by a feed paper sensor installed at the paper supply port. Upon detection of jamming an information meaning the generation of paper jamming is stored as an engine status in a mechanism controller in the printer.

Sheets of paper whose printings have been completed are discharged onto paper receiving tray through a paper discharge port of the printer. During this time, supervision of paper jamming in the main body of the printer and in the paper discharge port are performed by a discharged paper sensor provided at the paper discharge port. Where paper jamming is detected, an information informing generation of an engine status in a mechanism controller.

According to the prior art technique the main controller contains therein a timer for anticipating an interval in which a sequence is being executed and a time at which the discharge of paper sheets is terminated by taking a time at which feeding of the sheets of paper has started as a reference point. During this period, the main controller inquires the mechanism controller as to the engine status. This is made for the purpose of judging whether printing data for one sheet of paper is to be held until what time, in addition to the supervision of the paper jamming. In this manner, the fact that time supervision of the printing sequence is effected in the main controller complicates the processing in the main controller. When the type of mechanisms is changed, the printing process speed and the printing sequence change so that it is necessary to amend the printing sequence time supervisory software of the main controller, thus degrading the design efficiency. Accordingly, it is very difficult to obtain a system by arbitrary combining mechanisms having different printing process speeds and printing sequence with a controller having a data processing speed commensurate with cost. To satisfy such requirement, it is necessary to add considerable amount of softwares, resulting in a cost up.

DISCLOSURE OF THE INVENTION

Accordingly, it is an object of this invention to provide a novel picture image forming apparatus wherein the mechanism controller of the picture image forming apparatus can inform to the main controller the timing regarding transfer of paper sheets, that is the paper feed start time, resist portion arriving time and the paper discharge completion time, thereby rendering unnecessary the time supervision necessary for executing the printing sequence of the main controller and decreasing the processing load of the main controller.

Another object of this invention is to provide an improved picture image forming apparatus in which the controller can accurately grasp the status of proceeding of the printing sequence, that is the starting time of the printing sequence, the picture image data transfer time.

A further object of this invention is to provide a novel picture image forming apparatus capable of coping with the printing process speed as mechanisms having different printing sequences without changing the main controller.

The picture image forming apparatus of this invention comprises a mechanism controller which controls mechanical elements (mechanisms) executing the printing sequence and means for effecting mutual communications between the mechanism controller and a main controller which forms picture image data based on data sent from an external host computer. When executing the printing sequence, the mechanism controller forms an information regarding the timing of the printing sequence in accordance with signals from a paper supply sensor and a paper discharge sensor.

In the embodiment to be described later, such signals as respectively representing a paper feed start time, a resist portion arrival time of the paper, and a paper discharge completion time are issued from the mechanism controller. These timing informations are sent to the main controller through the communication means. For this reason, the main controller can supervise the printing sequence without performing a time control by providing a timer in the main controller.

BEST MODE FOR CARRYING OUT THE INVENTION

An embodiment of this invention will now be described with reference to the drawings.

Figure 1:
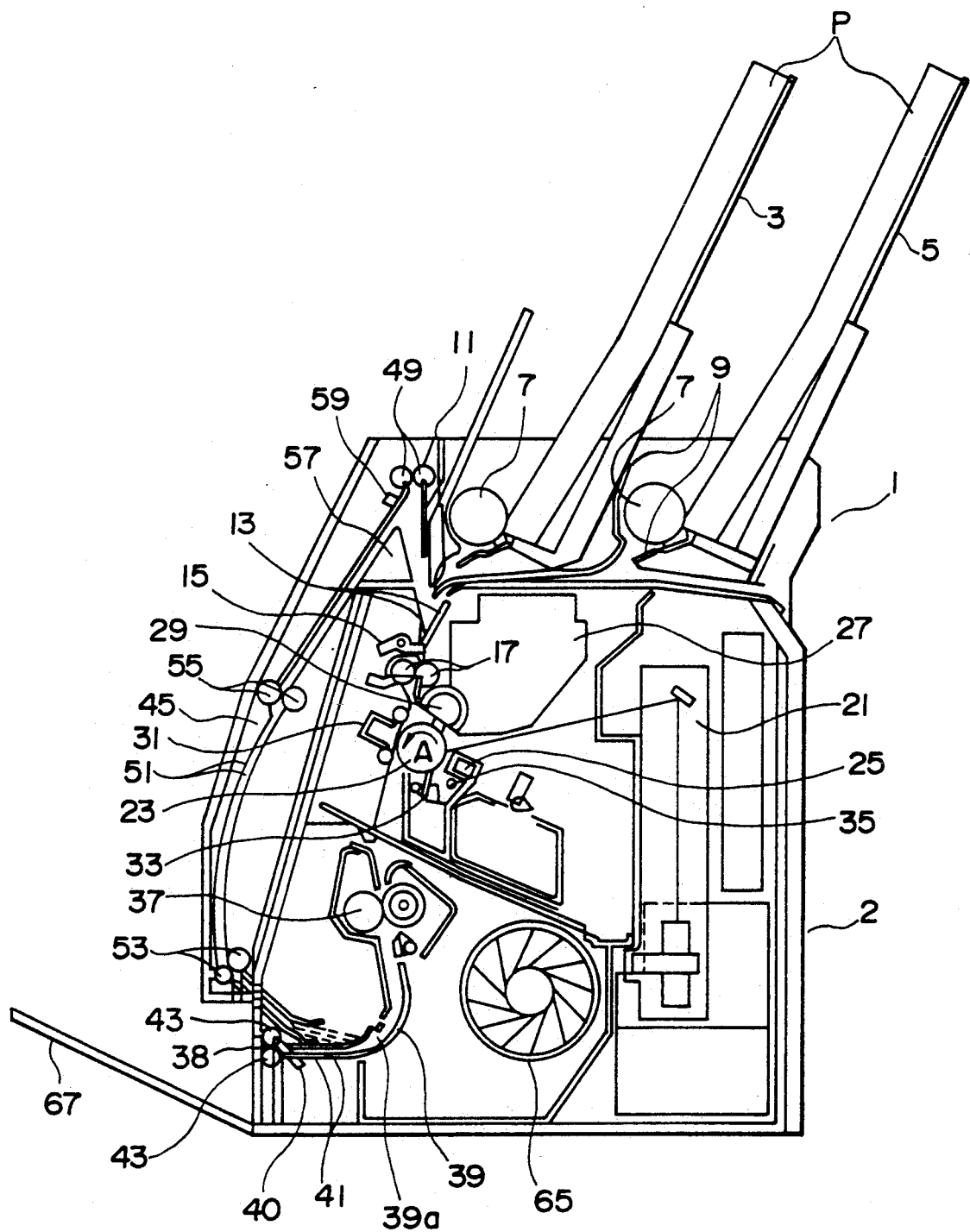
FIG. 1 is a sectional view showing one embodiment of the picture image forming apparatus according to this invention.

FIG. 1 shows the construction of the mechanical elements of one embodiment of the picture image forming apparatus embodying the invention. In this embodiment, a paper supply device 2 includes stackers 3 and 5 on an upper portion of the printer for respectively storing paper sheets P of two types, and pick up rollers 7 and fingers 9 for taking out the paper sheets P, one after one, and then supplying the paper sheets to paper supply port 13.

Beneath the paper supply port 13 is located paper detector 15 which detects completion of feeding each of the paper sheets P, and gate rollers 17 sending the supplied paper sheets to a printing mechanism located below the paper detector 15.

Beneath the gate rollers 17 is a photosensitive drum 23 that is irradiated with a light beam modulated by the picture image data, a charging device 25, a developing device 27, a transfer printing device 31, a toner recovery device 33 and a laser beam device 35. These are disposed about the photosensitive drum 23 is disposed a fixing device 37 which fixes a toner transfer printed onto the paper sheets. By using these printing mechanisms, picture images are formed on the paper sheets P.

The lower end of the fixing device 37 acts as a discharge port 38 so that the paper sheets P arriving at the fixing device are sent out by fixing rollers 37 through the discharge port 38 after being fixed. Between the fixing rollers 37 and the discharge port 38 is installed a discharged paper detector 40 which detects passing of the paper sheets through the fixing rollers 37. By utilizing the output of the discharged paper detector 40, the start of the paper discharge from the fixing rollers 37 and completion of the paper discharge can be supervised.

Figure 2:
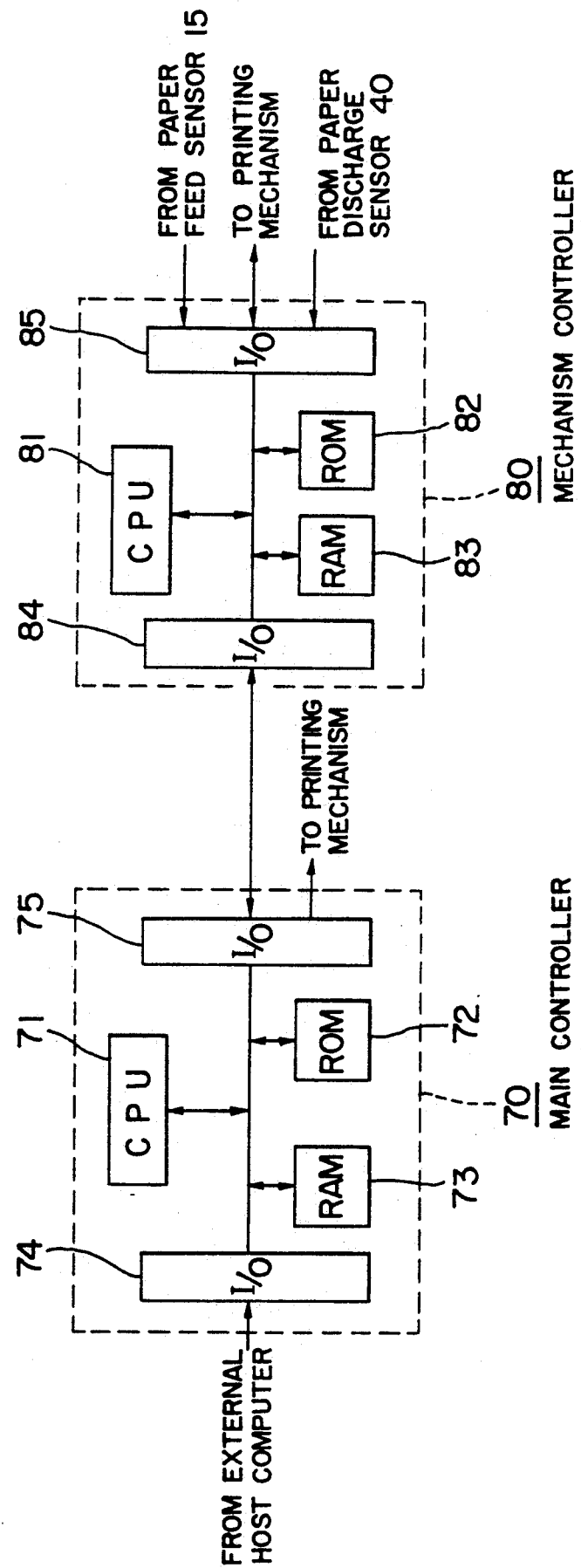
FIG. 2 is a block diagram showing one embodiment of a control device utilized in the apparatus shown in FIG. 1.

FIG. 2 is a block diagram showing a main controller and a mechanism controller utilized in the embodiment. The main controller 70 includes a CPU 71, a ROM 72, and a RAM 73. The main controller receives a printing data from an external host computer, not shown, converts the printing data into a picture image data and communicates with the mechanism controller 80 to send out the picture image data to a printing mechanism while checking the condition thereof.

The mechanism controller 80 includes a CPU 81, a ROM 82 and a RAM 83 and controls the operation of the printing mechanism in accordance with a printing commanding instruction from the main controller 70. At the same time, the mechanism controller 80 performs supervision of paper transfer based on output signals from the paper feed sensor 15 and the paper discharge sensor 40, thus informing the timings of paper feed start, a ready condition of printing and completion of paper discharge to the main controller 70.

Figure 3:
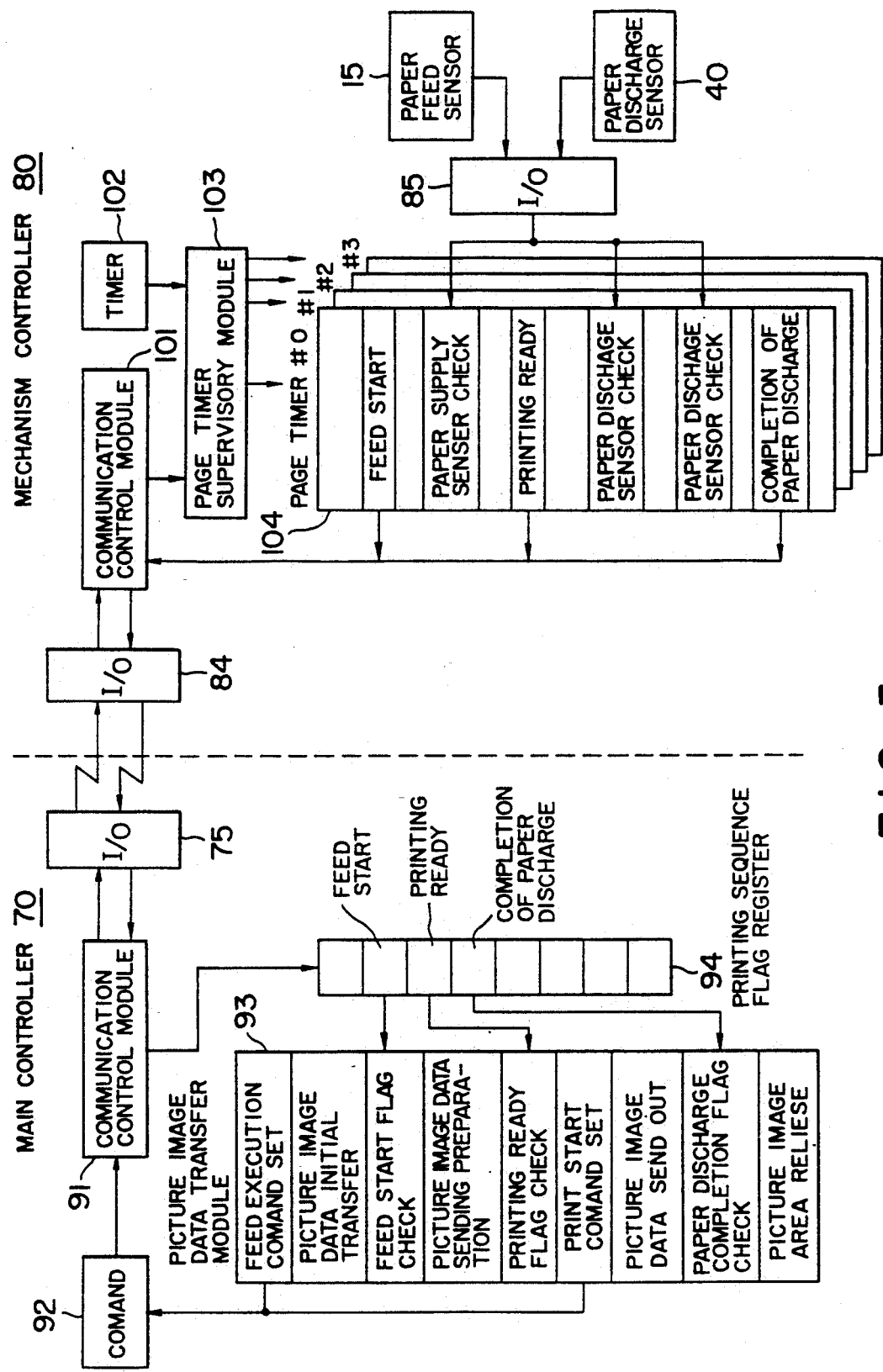
FIG. 3 is a function block diagram of a portion relating to the printing sequence control of the control device shown in FIG. 2.

FIG. 3 is a function block diagram of parts regarding the printing sequence control of the main controller 70 and mechanism controller 80. In the main controller 70, when preparation of the picture image data of one page is completed based upon the data received from the external host computer, a picture image data transfer module 93 is started. Once started, the picture image transfer module 93, sets a paper feed execution command instruction in a command queue 92. Concurrently therewith, transfer of the picture image data to the picture image data transfer buffer, not shown, is commenced. The paper feed execution command instruction set in the command queue is transmitted to mechanism controller 80 by a communication control module 91.

Upon receiving a paper feed execution command instruction, in the mechanism controller 80, the communication module 101 sends a starting signal of a page timer 102 of a page timer supervising module 103. In response to the starting signal, the page timer supervising module 103 starts a page timer 104 now in an idle state. The term "page timer" 104 means a module executing the printing sequence of one page while supervising the time required for printing one page, one page timer 104 corresponding to the printing sequence of paper feeding, printing and paper discharge, for example, of the timing chart shown in FIG. 4. When started, the page time 104 performs a time control and the supervision of sensors 15 and 40 with a timing set by calculating such physical conditions as the constructions and dimensions of the mechanism. At the same time, the page timer executes the printing sequence. While this printing sequence is being executed, the page timer 104 sends timing signals to the main controller 70, respectively representing a feed start, a printing ready and paper discharge completion.

In the main controller 70, as the communication control module 91 receives a timing signal from the mechanism controller 80, the communication control module judges the type of the timing signal for setting a corresponding flag in the printing sequence flag resistor 94. While checking the timing signal flags, the picture image transfer module 93 continues to transfer the picture image data to a picture image data transfer buffer device. In parallel therewith, the picture image data is transferred from the picture image data transfer buffer device to a light beam modulating device, not shown, in the printing mechanism.

When the execution of the printing sequence corresponding to one page terminates, the picture image data transfer module 93 releases a picture image data area thus finishing its own processing. Also the page timer 104 in the mechanism 80 completes its processing, thereby returning to the idle state.

Figure 4:
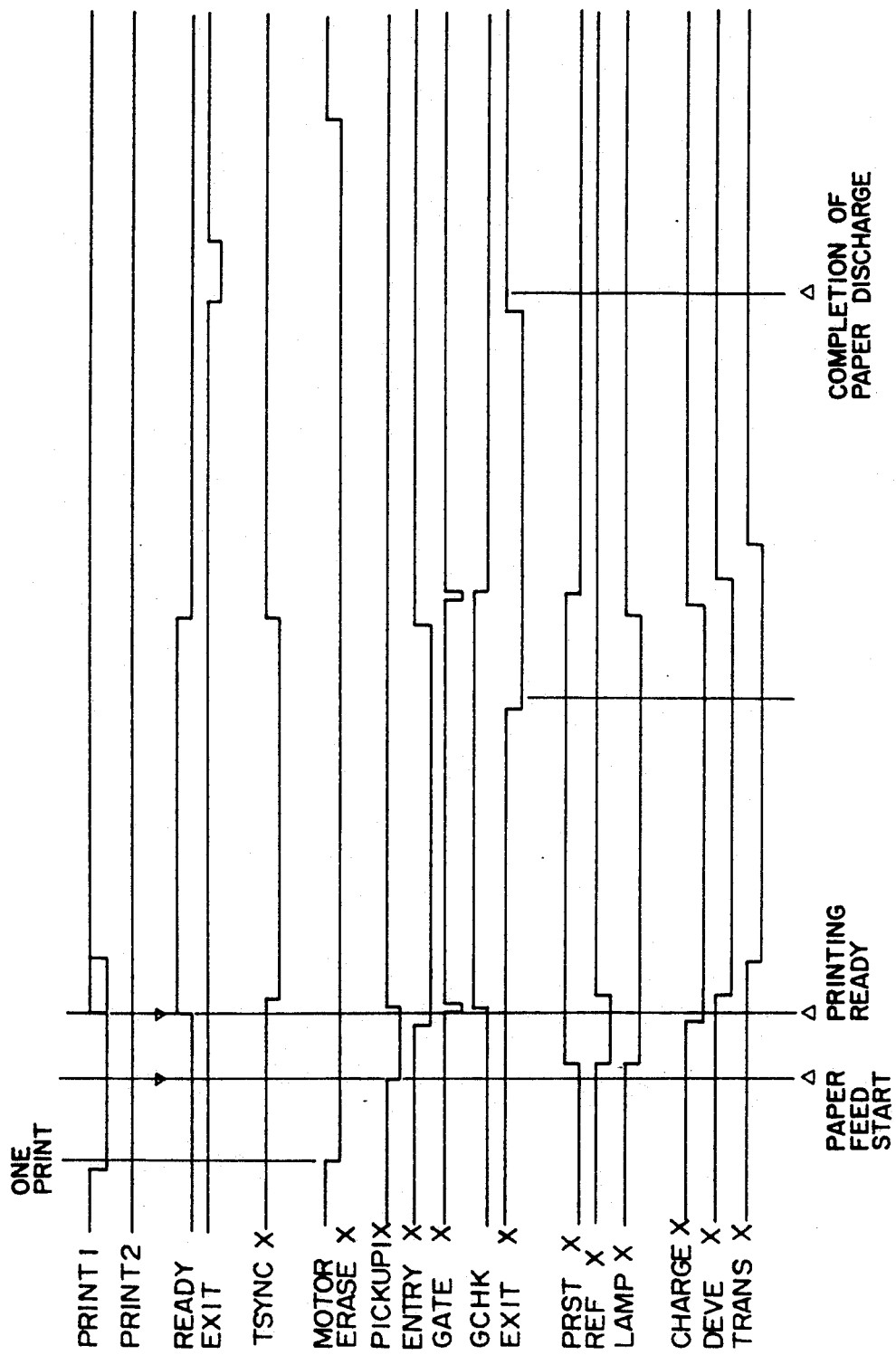
FIG. 4 is a timing chart showing the operation of the apparatus shown in FIG. 1.

FIG. 4 is a timing chart showing a printing sequence of one page. The printing operation of the picture image forming apparatus will be described as follows with reference to FIGS. 1-4.

When a switch of an electric source for the picture image forming device is closed, the image controller 70 sends a command message to the mechanism controller 80 so as to send a timing signal regarding the printing sequence to the main controller 70 from the mechanism controller 80. Thereafter, the printing operation is performed as follows:

When the main controller 70 receives a printing instruction from an external host computer, it prepares to send out to the printing mechanism the picture image data which has been stored in RAM 73 in the main controller 70. After completion of this processing, a paper feed signal is transmitted to the mechanism controller 80. Upon receival of the paper feed signal, the mechanism controller 80 drives a polygonal mirror where the picture image forming apparatus is sound. After confirming that the revolution rate of the polygonal mirror has reached a constant value, the controller 80 starts a main motor, not shown. After confirming the fact that the main motor has reached a constant speed, the controller engages a paper feeding clutch, not shown, to begin feeding the paper sheets from paper stacker 3 or 5. At this time, paper feed start signal is sent to the main controller 70 from the mechanism controller 80. Upon receival of this signal, and after sending out a paper feeding execution command signal, the main controller 70 confirms the fact that paper feeding operation has been started. This confirmation is used as an information for judging that a paper jam condition needs to be recovered or not. This judgment is made where the papers are not fed, no recovery is necessary, whereas when the papers are continuously fed, recovery is necessary.

After starting paper feeding, and at a time before the paper sheet reaches a resist roller through paper detector 15, a signal representing a printing ready condition is sent from the mechanism controller 80 to the main controller 70. When this signal is received and when the printing preparation operation has been completed, the main controller 70 sends a printing command signal to the mechanism controller 80. In response to this command signal, the mechanism controller 80 starts the execution of the printing sequence. With this control, the main controller 70 is not required to supervise the interval between the paper feed starting time and the print starting time. As a consequence, the main controller 70 is only required to wait for the printing ready signal while preparing the printing operation.

As the printing sequence proceeds for completing the printing of one page, and when the paper discharge sensor 40 detects that sending out of the printed paper sheet from the fixing device 37 through discharge port 37 has been completed, the mechanism controller 80 sends a signal representing that paper discharge has been completed to the main controller 70. Upon receival of this signal, the main controller 70 releases a picture image data area for the fixed paper sheet. For this reason, the main controller 70 is not required to anticipate the timing of termination of paper discharge for releasing the picture image data area thus making it unnecessary a time supervision effected by the main controller 70.

When the printing of one page is completed and the paper discharge has been completed, the main controller only judges that whether the printing is made continuously or to enter into a waiting state. When the printing is to be continued above procedures are repeated.

It should be understood that the invention is not limited to the embodiment described above but can be applied to other embodiments of various types.

I claim:

1. Picture image forming apparatus comprising: sensor means for detecting feeding and discharging sheets of paper; a mechanism controller for controlling mechanical members utilized to execute a sequence of operations including paper feeding, printing and paper discharging operations, a main controller for forming picture image data based on data supplied from an external host computer and for transferring said picture image data to said mechanical members, wherein there are provided communications means for effecting bidirectional communications between said mechanism controller and said main controller, and said mechanism controller includes timer means issuing information regarding a timing of said sequence of operations in response to output signals of said sensor means, said information issued from said timer means being informed to said main controller by said communication means, said main controller having a flag resistor means for registering said informed information and flag check means for checking said informed information registered by said flag register means so that said main controller is enabled to supervise said sequence of operations.

2. The picture image forming device according to claim 1 wherein said information includes at least one of signals respectively representing a paper feed start, a printing ready status, and a paper discharge completion.

3. Picture image forming apparatus comprising: a mechanism controller for controlling mechanical members utilized to execute a sequence of operations including paper feeding, printing and paper discharging operations, a main controller for forming picture image data based on data supplied from an external host computer, wherein there are provided communication means for effecting bidirectional communications between said mechanism controller and said main controller, and said mechanism controller includes timer means issuing information including at least one of signals respectively representing a paper feed start and a paper discharge completion, said information issued from said timer means being informed to said main controller by said communication means.

4. The picture image forming apparatus according to claim 1 wherein said main controller uses said signal representing said paper feed start for judging whether a paper jam conditions needs to be recovered.

5. The picture image forming apparatus according to claim 1 wherein said main controller uses said signal representing said paper discharge completion for judging whether a picture image data area can be released.

* * * * *